United States Patent [19]

Taylor

[11] 3,861,879

[45] Jan. 21, 1975

[54] PYROELECTRIC GAS DOSIMETER

[75] Inventor: Allen L. Taylor, Woodbury Township, Washington County, Minn.

[73] Assignee: Minnesota Mining and Manufacturing Company, St. Paul, Minn.

[22] Filed: Jan. 2, 1974

[21] Appl. No.: 430,054

[52] U.S. Cl............................... 23/254 E, 23/255 E
[51] Int. Cl....................... G01n 31/10, G01n 25/22
[58] Field of Search ....... 23/254 E, 255 E; 73/27 R, 73/355 R

[56] References Cited
UNITED STATES PATENTS

| | | | |
|---|---|---|---|
| 2,743,167 | 4/1956 | Cherry............................ | 73/27 R X |
| 2,916,358 | 12/1959 | Valentine et al.................. | 23/254 E |
| 3,453,432 | 7/1969 | McHenry....................... | 73/355 R X |
| 3,657,644 | 4/1972 | Beam et al..................... | 73/355 R X |

*Primary Examiner*—Robert M. Reese
*Attorney, Agent, or Firm*—Alexander, Sell, Steldt & De La Hunt

[57] ABSTRACT

An apparatus for detecting the presence of certain gases includes a housing with a front wall having a plurality of openings to permit the influx of a surrounding atmosphere by convectional flow. Disposed in the housing is a layer formed from a poled pyroelectric material on which a number of conductive plates are positioned. Certain of the conductive plates are coated with a catalyst, and electronic circuitry is associated with the conductive plates to sense electrical signals thereon that indicate the presence of the gas desired to be detected.

11 Claims, 4 Drawing Figures

PATENTED JAN 21 1975 3,861,879

3,861,879

PYROELECTRIC GAS DOSIMETER

BACKGROUND OF THE INVENTION

1. Field of the Invention

The present invention relates in general to detectors for sensing the presence of certain gases and more specifically to the employment of a pyroelectric material in such detectors.

2. Description of the Prior Art

A wide variety of detectors are known in the art for sensing the presence of particular gases. However, with an increased awareness in industry for the need of protecting employees from exposure to harmful concentrations of certain gases, a demand has developed for a highly sensitive, portable carbon monoxide detector that may be inexpensively manufactured to permit its use by individual personnel. No existing prior art gas detector satisfactorily fulfills all of the above requirements.

SUMMARY OF THE INVENTION

The present invention provides an apparatus for detecting the presence of certain gases and includes an open housing in which a pyroelectric layer of material is positioned. Spaced apart, conductive plates are disposed on each surface of the pyroelectric layer and at least one of such plates is coated with a substance that serves as a catalyst for the gas desired to be detected. An electronic circuit is employed to sense electrostatic charges on the conductive plates and indicate the presence of a predetermined amount of the gas desired to be detected.

In a preferred embodiment the housing of the detector is formed with a front chamber portion and a back chamber portion connected together at one end by a neck portion and separated at an opposite end by a cleft. The housing is relatively thin and narrow and the cleft permits the detector to be fastened on a belt or a shirt pocket in order that the detector may be easily carried by individual personnel to provide an indication of the amount of exposure that such personnel have had to the gas desired to be detected.

Temperature compensation of the detector is provided by employing the conductive plates on each side of the pyroelectric layer, which plates are interconnected in such fashion that only selective heating of the plates produces a sensing indication by the detector, whereas a change in the ambient temperature of the environment in which the detector is located will not trigger the detector. The selective heating of the plates is produced by coating only certain of the plates with the oxidation catalyst. Thus, the present invention provides a gas detector that is not only small in size, but relatively simplistic in operation and construction, and can be inexpensively manufactured.

The foregoing and other advantages of the present invention will appear from the following description. In the description reference is made to the accompanying drawings, which form a part hereof, and in which there is shown by way of illustration, and not of limitation, a specific form in which the invention may be embodied. Such embodiment does not represent the full scope of the invention, but rather the invention may be employed in a variety of embodiments, and reference is made to the claims herein for interpreting the breadth of the invention.

DESCRIPTION OF THE PREFERRED EMBODIMENTS

Figure 1:
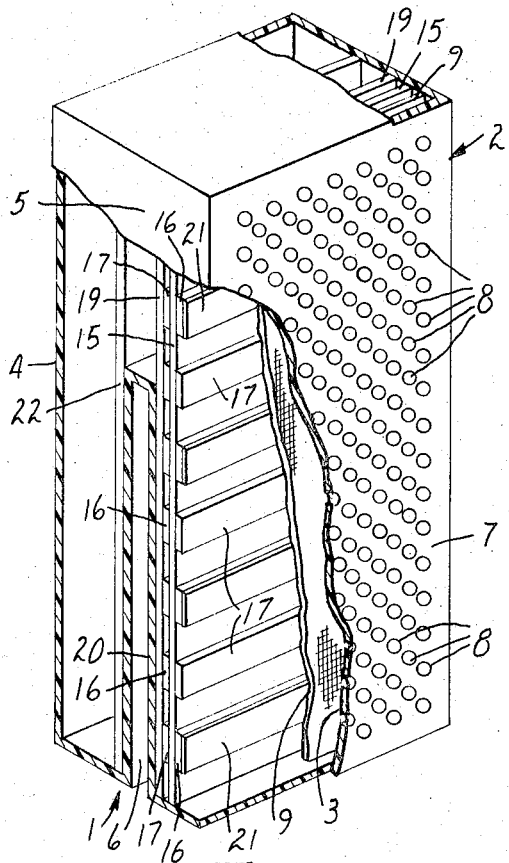
FIG. 1 illustrates a perspective view of a detector representing a preferred embodiment of the present invention, with portions of the detector cut away to expose interior components.

Referring now to the drawings and with specific reference first to FIG. 1, a detector 1 represents a first preferred embodiment of the present invention. Preferably, the detector 1 is adapted for the detection of carbon monoxide. However, the present invention is not solely limited to such use since the principles of the present invention are applicable for employment in detectors for other gases.

The detector 1 includes a housing 2 having a front rectangular chamber portion 3 and a back rectangular chamber portion 4 that is connected to the front portion 3 at one end by a neck portion 5, and is separated from the portion 3 below the portion 5 by a cleft 6. The housing 2 is relatively thin and narrow, and the cleft 6 permits the detector 1 to be fastened on a belt or a shirt pocket, with the front chamber portion 3 hooked over the front of the pocket or belt in a fully exposed condition. However, the housing 2 may also be of the form using only the front chamber portion 3 since the cleft 6 is not essential to the operation of the present invention.

The chamber portion 3 has a front wall 7 in which a plurality of apertures 8 are formed to permit the influx of the surrounding atmosphere into the interior of the portion 3.

Inside the chamber portion 3, a charcoal filter 9 is positioned near the front wall 7 to serve as a screen for eliminating hydrocarbons in the atmosphere that enters the interior of the portion 3. Also disposed in the chamber portion 3 is a layer 15 of poled pyroelectric material that is preferably formed from such materials as a thin sheet of polyvinylidene fluoride or a ceramic plate of lanthanum-modified lead zirconate-titanate. Poled pyroelectric materials exhibit the unique characteristic of developing electrostatic charges on their planar surfaces when subjected to a change in ambient temperature, with the charges developed on one surface opposite in polarity to those developed on the other surface.

Although a few pyroelectric materials have dipoles that are naturally aligned in a poled relationship, normally the dipoles of pyroelectric materials are essentially arranged in random fashion. These dipoles can be rearranged in orientation when a pyroelectric material is heated above a particular temperature known as the poling temperature. At the poling temperature, the dipoles of a pyroelectric material will orient themselves in accordance with an applied electric field. The degree of dipole orientation is a function of the temperature to which the pyroelectric material is heated, the applied field strength and length of time the field is applied. For example, substantial poling begins in polyvinylidene fluoride when it is heated to a temperature greater than 90° C and an electric field of at least 4,000 volts per millimeter of thickness is then applied for approximately 15 minutes. Increasing the temperature and/or the applied electric field will progressively increase the degree of poling achieved up to a maximum of saturation.

Once a pyroelectric material is poled and then cooled below its poling temperature, the applied field may be removed and the dipoles will remain as oriented by the applied field. The pyroelectric material will thereafter produce opposite electrostatic charges on its planar surfaces when its ambient temperature is increased or decreased. Care should be taken though to insure that the material is not heated above its poling temperature for extended periods since such a condition causes the dipoles to return to a random orientation.

Figure 2:
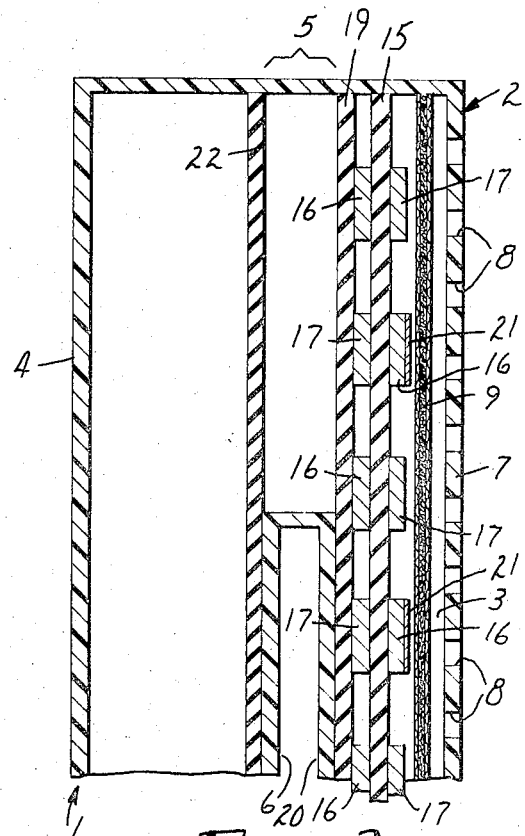
FIG. 2 is an enlarged side view in cross section of an upper portion of the detector of FIG. 1.

A plurality of spaced apart conductive plates 16 and 17 are disposed on each planar surface of the layer 15 and are arranged so that each plate 16 on the front surface of the layer 15 is adjacent to a plate 17 on the same surface of the layer 15, and opposite to a plate 17 on the back surface of the layer 15. The conductive plates 16 and 17 are preferably formed by coating each side of the layer 15 with a material having good conductive characteristics such as aluminum, with selected areas of the material removed by etching. For purposes of clarity, the layer 15 and the plates 16 and 17 are drawn on a substantially enlarged scale in FIGS. 1 and 2, and in actuality the thickness of the layer 15 and the plates 16, 17 is less than 125 microns. Accordingly, the layer 15 is susceptible to vibration. To prevent vibration, the assembly composed of the layer 15 and plates 16, 17 is mounted on a stiff backing card 19 that is secured to a rear wall 20 of the chamber portion 3. The backing card 19 preferably is formed from a heat insulating material to isolate the front chamber portion 3 from the rear chamber portion 4.

The plates 16 on the front surfaces of the layer 15 are each coated with a catalyst that produces an exothermic or endothermic chemical reaction between the gas desired to be detected and oxygen. For example, to detect carbon monoxide with the detector 1 the front plates 16 are each coated with a platinum black layer 21 or other such carbon monoxide oxidation catalyst that produces a chemical reaction between carbon monoxide and oxygen in correspondence with the equation $2CO + O_2 \xrightarrow{cat.} 2CO_2 +$ heat. Thus, in the presence of carbon monoxide, the oxidation catalyst coated plates 16 become heated and in turn heat only those portions of the layer 15 between coated plates 16 and the plates 17 on the back or opposite side of the layer 15 and it is such heating that is critical to the operation of the present invention. To increase the reaction between oxygen and carbon monoxide in the presence of the catalyst 21, a heating element may be included in the chamber portion 3 to uniformly heat the pyroelectric layer 15 to approximately 100°C. The charcoal filter 9 is employed to prevent spurious heating of the coated plates 16 and 17 by insuring that the atmosphere entering the interior of the chamber portion 3 is substantially stripped of hydrocarbons that may also react with oxygen in the presence of the catalyst 21 with a resulting heat by-product. The filter 9 also prevents radiant energy from producing appreciable heating of the layer 15.

Figure 3:
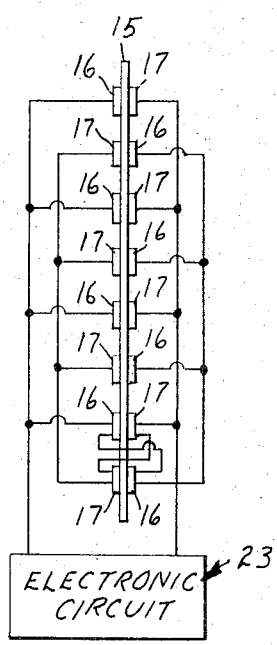
FIG. 3 is a diagrammatic view of a pyroelectric layer that is included in the detector of FIG. 1 and has a plurality of plates disposed on each surface, which plates are interconnected together to form two sets that connect with an electronic circuit.

As shown in FIG. 3, the plates 16 are electrically interconnected as are the plates 17 to form two sets of plates so as to provide temperature compensation for the detector 1 to prevent the creation of a detection signal due to a rise in the ambient temperature of the environment in which the detector 1 is employed. When the temperature of the entire layer 15 is varied due to a change in ambient temperature of the environment of the detector 1, electrostatic charges of opposite polarities appear on the plates 16 and 17, with the plates 16 and 17 on the front surface of the layer 15 having one polarity and the plates 16 and 17 on the rear surface having an opposite polarity. A total negation of such charges due to ambient temperature changes results. This temperature compensation arrangement is described in greater detail in may copending application entitled "Pyroelectric Temperature Compensated Sensing Apparatus," Ser No. 430,055, filed on the same day herewith and incorporated herein by reference.

Figure 4:
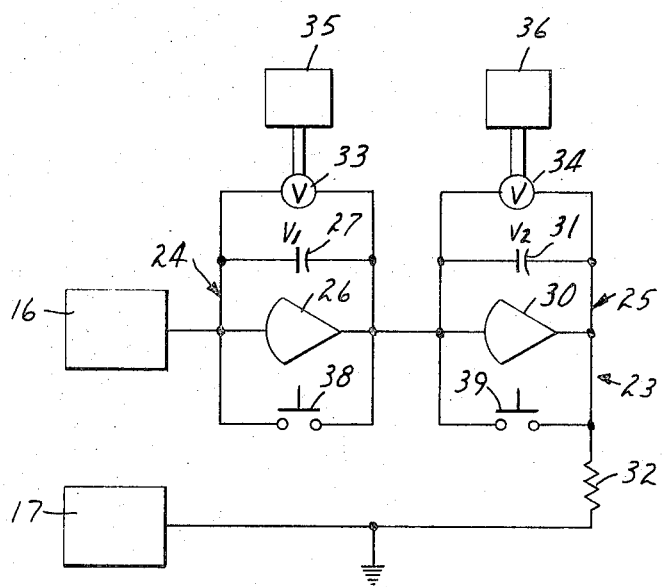
FIG. 4 is a schematic view of the electronic circuit of FIG. 3.

With temperature compensation provided for ambient temperature changes, the detector 1 will provide a detecting signal in response to the presence of a predetermined amount of the gas desired to be detected. For purposes of this explanation it is assumed the plates 16 are coated with a catalyst that generates heat in the presence of carbon monoxide. The spacing between the plates 16 and 17 on each surface of the layer 15 is substantially greater than the thickness of the layer 15 in order that a variation in the temperature of the catalyst coated plates 16 can result in a variation in the temperature of the entire cross section of the layer 15 in contact with such plates without producing an appreciable variation in the temperature of the layer 15 interposed between two noncoated plates 16 and 17. Consequently, electrostatic charges of opposite polarites are respectively produced only on the portions of the surfaces of the layer 15 heated by the catalyst coated plates 16. Because the layer 15 is electrically non-conductive, such charges are not dispersed throughout the layer 15, but are accumulated on the catalyst coated plates 16 and the oppositely positioned plates 17. Disposed in the chamber portion 4 is a printed circuit card 22, as shown in FIG. 3, having an electronic circuit 23, which is shown in FIG. 4, having its input connected across the plates 16 and 17 to sense electrostatic charges thereon and provide a sensing indication when at least a predetermined amount of charges are present The electronic circuit 23 includes a first integrating amplifying circuit 24 and a second integrating amplifying circuit 25. The input of the integrating circuit 24 is connected to the plates 16 and is composed of a high gain amplifier 26 and a capacitor 27 connected parallel with the amplifier 26. The integrating circuit 25 is connected to the output of the circuit 24 and, similar to the circuit 24, has a high gain amplifier 30 and a capacitor 31 connected parallel with the amplifier 30. A current limiting resistor 32 is connected to the output of the integrator 25 and the plates 17 to complete the circuit 23. To provide a means for sensing the output of the integrating circuits 24 and 25, voltmeters 33 and 34 are respectively connected across the capacitors 27 and 31.

The two integrating circuits 24 and 25 of the electronic circuit 23 operate to provide an indication of a predetermined amount of exposure to the gas desired to be detected at any given point of time and to also provide an indication of the total amount of such exposure during an extended period of time. Current supplied to the integrating circuit 24 from the plates 16 is in a direct proportion to the surface areas of the catalyst coated plates 16 multiplied by $dT/dt$ the change in temperature of the heated portion of the layer 15 with respect to time. Such current is integrated by the circuit 24 to produce a charge Q, which charge is evidenced by a voltage $V_1$ across the capacitor 27 in proportion to the concentration of the gas desired to be detected that comes in contact with the coated plates 16.

If it is desired that the detector 1 merely sense specific concentrations of gas at any given instant of time, the first integrating circuit 24 is all that is required in the circuit 23 since the second integrating circuit 25 integrates the voltage $V_1$ to provide a voltage $V_2$ across the capacitor 31, which voltage is proportional to the total number of exposure of the detector 1 to the gas desired to be detected over an extended period of time. Variably adjustable alarms 35 and 36 are respectively connected with each volt meter 33 and 34 to actuate upon the sensing of predetermined voltage levels of $V_1$ and $V_2$. To reset the detector 1 by discharging the voltage $V_1$ and $V_2$ normally open switches 38 and 39 are respectively provided across the capacitors 27 and 31. Accordingly, personnel utilizing the present invention are provided with a means for indicating not only the instantaneous level of exposure to what may be a deleterious gas, but also the total exposure to such gas over an extended period of time.

What is claimed is:

1. An apparatus that detects the presence of a particular gas and comprises:
   a housing that is open to the surrounding atmosphere to permit the atmosphere to flow therein;
   a poled pyroelectric layer of material disposed in said housing;
   a pair of conductive plates disposed on said layer which plates are positioned opposite from one another on each planar surface of said layer;
   a catalyst coated on at least one of said plates; and
   electronic circuit means for sensing electrical signals on said conductive plates and indicating the presence of the gas desired to be detected.

2. An apparatus as recited in claim 1 wherein said apparatus is temperature compensated by the use of a plurality of spaced apart conductive plates that are disposed on each surface of said pyroelectric layer and are electrically interconnected to form two sets of interconnected plates, one of which set of plates includes at least one plate that is coated with said catalyst.

3. An apparatus as recited in claim 1 wherein said electronic circuit includes a first circuit that indicates the presence of at least a predetermined level of the gas desired to be detected and a second circuit that indicates the total amount of exposure to such gas.

4. An apparatus as recited in claim 1 wherein said housing has a front chamber portion and a back chamber portion connected to the front portion at one end by a neck portion and separated from the front portion at an opposite end by a cleft, which front portion houses said pyroelectric layer and said back portion houses said electronic circuit means and said front and back portions are heat insulated from one another.

5. An apparatus as recited in claim 1 wherein the housing includes a front wall having a plurality of apertures that serve to open the housing to the atmosphere, and a screen is positioned between said pyroelectric layer and said front wall to shield said layer from radiant energy passing through said apertures.

6. An apparatus as recited in claim 5 wherein said screen is formed of a material that removes hydrocarbons that enter said housing.

7. An apparatus as recited in claim 1 wherein said catalyst produces a chemical reaction between oxygen and the gas to be detected.

8. An apparatus as recited in claim 7 wherein said reaction is endothermic.

9. An apparatus as recited in claim 7 wherein said reaction is exothermic.

10. An apparatus that detects the presence of carbon monoxide and comprises:
    a housing that is open to the atmosphere to permit the influx of air into said housing;
    a layer of poled pyroelectric material that produces electrostatic charges on its surfaces when its ambient temperature is varied, the charge on one surface being opposite in polarity to the charge on the other surface;
    at least one conductive plate disposed on each surface of said layer;
    a carbon monoxide oxidation catalyst coated on at least one of said plates; and
    electronic circuit means connected between said conductive plates for detecting electrical signals on said plates.

11. An apparatus as recited in claim 10 wherein said apparatus is temperature compensated by the use of a plurality of spaced apart conductive plates that are disposed on each surface of said pyroelectric layer and are electrically interconnected to form two sets of interconnected plates, one of which sets of plates includes said one plate that is coated with said carbon monoxide oxidation catalyst.

* * * * *

UNITED STATES PATENT OFFICE
CERTIFICATE OF CORRECTION

Patent No. 3,861,879          Dated January 21, 1975

Inventor(s) Allen L. Taylor

It is certified that error appears in the above-identified patent and that said Letters Patent are hereby corrected as shown below:

Column 3, line 42, change "surfaces" to --surface--.

Column 5, line 9, change "dT/dt" to --dT/dt,--;

line 10, change "portion" to --portions--;

line 22, change "number" to --amount--.

Signed and sealed this 1st day of April 1975.

(SEAL)
Attest:

RUTH C. MASON
Attesting Officer

C. MARSHALL DANN
Commissioner of Patents
and Trademarks